United States Patent Office 2,991,222
Patented July 4, 1961

2,991,222
SOLUBILIZED METAL SALTS OF N-NITROSO N-ARYLHYDROXYL AMINES
George J. Leitner, Iselin, N.J., assignor to Heyden Newport Chemical Corporation, New York, N.Y., a corporation of Delaware
No Drawing. Filed Mar. 27, 1957, Ser. No. 648,767
2 Claims. (Cl. 167—30)

This invention relates to methods of solubilizing metal salts of N-nitroso N-arylhydroxyl amines, the end products of which are useful for various purposes including uses as fungicides and fungistats to be applied to textile materials, cellulosic materials, protective coatings, plastics and in agriculture. In the agricultural field, the end products of this invention may be used either in connection with growing plants or on the harvested fruits or seeds thereof.

The object of this invention is to solubilize such materials so that they may be used as a homogeneous oil solution or as an emulsion derived from the solubilized oil base product.

I have found, after prolonged experimentation, research and tests, that the oil insoluble metal salts of N-nitroso N-arylhydroxyl amines, including the copper salt of N-nitroso N-phenylhydroxyl amine, commonly known as "copper cupferron," can be solubilized by commingling said metal salts with the alcoholates and phenolates of aluminum, titanium or zirconium, or mixed alcoholates or phenolates containing an acylate substituent on said aluminum, titanium or zirconium. The resulting solubilized products are readily soluble in Stoddard solvent, various naphthas and other commonly used organic solvents or organophilic vehicles. While this solubilization can occur at room temperature, in many cases it is greatly facilitated by the application of heat.

In carrying out this invention I may employ either monobasic or dibasic acids. In the event that a monobasic acid is employed with stoichiometric ratios, the following formulation will apply:

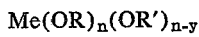
Me(OR)$_n$(OR')$_{n-y}$ wherein Me is a metal selected from the group which consists in aluminum, titanium and zirconium, $n$ is the metal valence, $y$ is an integer 1–4, R is an alkyl or aryl group, and R' is selected from the group which consists of a monobasic acyl, a dibasic acyl, and half esters of a dibasic acyl.

In the case of a dibasic acid with stoichiometric ratios, the formulation will be:

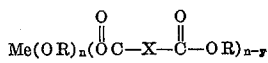
$$\text{Me(OR)}_n(\overset{O}{\overset{\|}{O}}\text{C—X—}\overset{O}{\overset{\|}{C}}\text{—OR)}_{n-y}$$

in which formula the representative symbols used are the same as above, and $x$ equals a dibasic acid residue.

The alcohol, phenol and acid radicals referred to in the above formulations may be exemplified by the following groupings:

Alcohols:
　Isopropyl
　Butyl
　Isooctyl
　Decyl
　Octadecyl
　Methoxyethyl
　Octadecenyl
　Dodecyl
　Dodecenyl Phenols:
　Phenyl
　Cresyl
　Nonylphenyl
　Isooctylphenyl
　Dodecylphenyl
Acids:
　Octadecenoyl
　Dodecanoyl
　a-Dodecenyl succinoyl
　a-Decyl succinoyl
　Phthalyl
　Maleyl
　Isopropyl a-dodecyl acid succinoyl
　Butyl a-octyl acid succinoyl
　Isooctyl acid phthalyl
　Tridecyl acid maleyl The alcoholates in the case of aluminum are prepared by the reaction of aluminum metal with a low molecular weight alcohol, such as ethyl, isopropyl or butyl alcohol and catalytic amounts of mercuric chloride and iodine. (Meerwein and Schmidt, Ann. 444, 221 (1925); Oppenauer, Rec. trav. chim. 56, 137 (1937)).

The higher alcoholates or the phenolates are made by transesterification from the lower alcoholates and according to the present invention, the mixed acylates, i.e., alcoholate-acylate or phenolate-acylate are prepared from the alcoholates or phenolates, as the case may be, with an accompanying loss of 1 mol of alcohol or phenol for each molecule of monobasic acid. In some cases the preparation of the partial acylate from the alcoholate or phenolate is accompanied with polymerization, particularly with titanium and zirconium, but this in no way interferes with the operativeness of this invention.

The titanium and zirconium alcoholates may be prepared by the interaction of their chlorides with an alcohol in the presence of ammonia which acts as a hydrochlorite acceptor (British Patent No. 512,452; C.A. 31, 654 (1937)).

The higher alcoholates and the phenolates of titanium and zirconium are also made by transesterification from the lower alcoholates.

I have found that the resulting product, a mixed alcoholate-acylate or a mixed phenolate-acylate, exhibits much greater stability toward hydrolysis resulting from exposure to moisture and also results in better or more universal solubility of the final solubilized product.

Furthermore I have found that the mixed alcoholates-acylates or mixed phenolates-acylates, prepared from the reaction of the alcoholate or phenolate with a dibasic acid anhydride, produce products of even greater superiority and the resulting products exhibit unusual water repellent properties.

Examples of compounds which have been found to be functional for the solubilization of the oil insoluble metal salts of N-nitroso N-arylhydroxyl amine are:

Aluminum monoisopropylate dioleate
Aluminum diisopropylate monolaurate
Aluminum monophenylate di(isopropyl a-octenyl acid succinate)
Aluminum monobutylate di(butyl acid phthalate)
Aluminum tri nonylphenylate
Aluminum tri ethoxyethylate
Aluminum di ethoxyethylate monostearate
Aluminum monobutylate di(butyl a-dodecenyl acid succinate)
Aluminum didodecylate monooctoate
Titanium diisopropylate dilaurate
Titanium monobutylate trioleate
Titanium triphenoxyethylate monolinoleate
Titanium tetra pentadecyl phenylate Titanium tetra octadecylate
Titanium diisopropylate di(isopropyl a-dodecenyl acid succinate)
Titanium dibutylate di(butyl acid maleate)
Titanium monoethylate tri(isooctyl acid adipate)
Titanium monocresylate tri(decyl acid tetrahydrophthalate)
Titanium triisooctylate mono(isooctyl a-phenyl acid succinate)
Zirconium monobutylate trioleate
Zirconium di p-tert.butylphenylate di(oleyl acid succinate)
Zirconium di isopropylate di(isopropyl a-decyl acid succinate)
Zirconium monobutylate trioleate
Zirconium tetra dodecylphenylate
Zirconium tri dodecenylate monolaurate
Zirconium tetra methoxyethylate
Zirconium di isopropylate di naphthenate
Zirconium monobutylate tri(butyl acid hexahydrophthalate)
Zirconium monoisopropylate monophenylate di(isopropyl a-dodecenyl acid succinate)

The use of the aforementioned aluminum, titanium and zirconium solubilizing agents to render the metal salts of N-nitroso N-arylhydroxyl amine soluble is accomplished by commingling at room temperature or in some cases at temperatures below the decomposition or vaporization point of the constituents. The use of 30 to 95 parts of these agents has been found to be effective in solubilizing from 5 to 30 parts of the oil insoluble metal salts.

These aluminum, titanium and zirconium solubilizing agents have an added beneficial effect upon treated cellulosic and textile articles. Not only do they serve as a solubilizing vehicle for the metal salt fungicidal composition, but they were also found to impart water repellency to the treated article. In many cases no other water repellent was necessary to obtain excellent water repellency for treated textile articles. In the standard spray test of the American Association of Textile Chemists and Colorists, the treated cloth had water repellent spray ratings of from 80 to 100%.

I have also found that the addition of certain amines to the aluminum, titanium and zirconium solubilizing agents increases the solubility of the water insoluble metal salts of N-nitroso N-arylhydroxyl amine, reduces the amounts of the aforementioned solubilizing agents needed, often improves the color of the fungicidally treated article, promotes solvent solubility, and makes the formulation more attractive economically. The addition of from 2 to 50% of these amines has in many cases permitted the reduction of the costly aluminum, titanium or zirconium solubilizing agent by as much as 20%.

Amines that have been found to be functional may be characterized as compounds containing from 3 to 36 carbon atoms and may also be oxygen containing compounds of the ether or hydroxy type. They may be primary, secondary or tertiary amines and also include substituted or unsubstituted amines. The organic portion of the molecule may be characterized as aliphatic, aromatic or cyclic.

Specific examples of these compounds are:

| | |
|---|---|
| Di n-butyl amine | N-aminopropyl morpholine |
| 2-ethylhexyl amine | 2-methyl, 2-amino, 1- |
| Cocoamine | propanol |
| Triethanolamine | Diisopropanolamine |
| Propylene diamine | o-Phenylene diamine |
| N-dodecyl propylene diamine | N-hydroxyethyl morpholine |
| | Aminoethyl ethanolamine |
| Isopropylamine | Tributylamine |
| Aniline | Didodecyl methylamine |
| Dimethylaniline | Octadecenylamine |
| Morpholine | Dioctadecylamine |

In the fungicidal treatment of articles where it is not desirable to have an amine present in the treated article, formulations using volatile amines, such as morpholine or methyl aminopropanol, are the compounds of preference.

By the use of the aforementioned aluminum, titanium or zirconium alcoholates or phenolates with or without the amines previously characterized, I have made possible the solubilization of oil insoluble metal salts of N-nitroso N-arylhydroxyl amines represented by the formula:

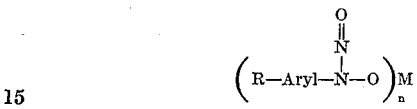

wherein R represents zero or more substituents in the aryl ring, examples of which are alkyl, halogen, aryl, aralkyl, alkoxy, aldehyde, carboxylic, sulfonic, alkenyl, alkylol, hydroxyl and amino groups. Specific examples of these groups are:

| | |
|---|---|
| Methyl | Naphthyl |
| Ethyl | Methylphenyl |
| Tertiaryamyl | Phenethyl |
| Butyl | Isobutylphenyl |
| Octyl | Hydroxy |
| Chloro | Methoxy |
| Fluoro | Ethoxy |
| Bromo | Phenoxy |
| Iodo | p-Toluene sulfonic acid |
| Phenyl | Dimethyl amino |

In said formula M represents a cation capable of forming an oil insoluble complex salt with an N-nitroso N-arylhydroxyl amine, and $n$ represents a valence of metal M. Examples of such cations are:

| | |
|---|---|
| Copper | Aluminum |
| Tin | Cobalt |
| Zinc | Magnesium |
| Calcium | Mercury |
| Barium | Cadmium |
| Zirconium | Sodium |
| Iron | Potassium |

The following examples set forth specific illustrative embodiments of the invention but are not to be construed as exclusive. In these examples "part" refers to part by weight.

As hereinbefore pointed out, the reactions to which I have referred may be carried out with or without the presence of the amines described. I prefer to practice the method with the amines present for experience has shown that the best results are obtained when they are present. This is particularly true where the amine is a volatile amine and can be removed with the solvent during the drying operation of the treated article. In the treatment of textile articles this makes possible minimum weight addition in the treated end product and at the same time materially reduces the cost of the treatment.

In the following examples I will first treat with the process as carried out in the presence of one of the amines referred to and will thereafter give examples relative to the carrying out of the method in the absence of amines.

EXAMPLE 1

To a flask fitted with an agitator, thermometer and a condenser are added 27.5 parts of aluminum triisopropylate and 72.5 parts of a-dodecenyl succinic anhydride. This mixture was heated with agitation at 360° F. for one-half hour.

To the resultant product, aluminum monoisopropylate di(isopropyl a-dodecenyl acid succinate), cooled to 200° F., 20 parts of mineral spirits, 20 parts of morpholine and 40 parts of powdered "copper cupferron" were added with agitation. Upon agitation for 30 minutes a homogeneous solution containing 20% of a solubilized "copper cupferron" was obtained. This product when diluted with mineral spirits showed good clarity and exhibited excellent solubility and stability.

Varying mineral spirit dilutions of this concentrate were used to treat 8 ounce cotton duck and compared fungicidally to samples similarly treated with a solubilized copper 8-quinolinolate. The basis for this comparison was the soil burial test, a test which is representative of the most severe conditions to which a fungicidally treated fabric can be subjected.

The tests were conducted with both leached and unleached fabric samples. The leaching procedure was as follows:

The specimen was cut to a dimension which, when placed in a two quart jar containing water, allowed all surfaces of the specimen to have free access to the water. A continuous flow of water was applied to the bottom of the jar at a rate of about 8 liters per hour for a period of 24 hours. At the end of the leaching period, the specimen was removed from the water and air dried.

In the soil burial chamber the specimens of fabric were placed horizontally on a 4 inch bed of soil, spaced at least one inch from any other specimen and covered with one inch of loam soil. After the exposure period of 4 and 8 weeks, the specimens were removed, washed, air dried and placed in a constant temperature room for 24 hours at 76° F. and 50% relative humidity. The resistance to mildew deterioration was determined by the change in the tensile strength of the material compared with the tensile strength of the original untreated fabric. The results are recorded in Table I, wherein copper 8-quinolinolate is used as a comparator. Water repellency evaluation results are listed in Table II.

anhydride, except that I changed this ratio, utilizing 1 part of aluminum triisopropylate to 1 part of a-dodecenyl succinic anhydride. The resulting product aluminum diisopropylate mono(isopropyl a-dodecenyl acid succinate) is equally functional as a solubilizing agent for "copper cupferron." In both procedures I obtained definite chemical compounds, but I wish it understood that the ratios referred to may be changed so that they do not necessarily constitute a chemical compound in the true sense and yet my tests have shown that they will solubilize "copper cupferron" in the manner stated.

EXAMPLE 3

I proceeded exactly as in Example 1, wherein I employed an aluminum solubilizing agent, but in this example I employed in its stead 120 parts of titanium diisopropylate di-(isopropyl a-dodecenyl acid succinate) with 15 parts of morpholine.

The end product, a solubilized "copper cupferron" was soluble in high flash naphtha, kerosene and mineral oil.

EXAMPLE 4

I followed the procedure of Example 1, using 140 parts of titanium dibutylate di(butyl a-dodecenyl acid succinate) with 5 parts of morpholine.

The end product was readily soluble in ethyl acetate, carbon tetrachloride and toluol.

EXAMPLE 5

40 parts of the copper salt of N-nitroso N-o-tolyl hydroxylamine was added to 100 parts of titanium diisopropylate di(isopropyl a-dodecenyl acid succinate), prepared by the reaction of 35 parts of tetra isopropyl titanate and 65 parts of dodecenyl succinic anhydride, accom-

*Table I*

FUNGICIDAL EVALUATION SOIL BURIAL TEST

| Compound | Theoretical, Percent Cu Depos. | Chem. Unlchd., Percent Cu | Anal. Lchd., Percent Cu | Fabric After Treatment | | Percent Retained Tensile Strength, Weeks' Incubation | | | |
|---|---|---|---|---|---|---|---|---|---|
| | | | | Hand | Color | Unleached | | Leached | |
| | | | | | | 4 | 8 | 4 | 8 |
| Untreated fabric control | | | | Soft | Off-white | 0 | 0 | 0 | 0 |
| Copper 8-Quinolinolate | 0.15 | 0.14 | 0.14 | Mod. Stiff | Yellow-green | 91 | 95 | 82 | 70 |
| | 0.30 | 0.29 | 0.25 | do | Deep yel. grn | 93 | 93 | 94 | 88 |
| Copper Cupferron | 0.20 | 0.20 | 0.14 | do | Lt. grey-grn | 98 | 92 | 91 | 87 |
| | 0.40 | 0.39 | 0.34 | do | Grey-green | 100+ | 93 | 97 | 90 |

*Table II*

WATER REPELLENCY TESTS

100=no wetting
90=slight random wetting
0=complete wetting

| | Percent Copper Metal Deposited | Spray Test Rating [1] | Suter Test,[2] ml. leakage in 10 minutes |
|---|---|---|---|
| Copper Cupferron | 0.05 | 100 | 770 |
| | 0.10 | 100 | 196 |
| | 0.20 | 100 | 32 |
| Copper Cupferron WR [3] | 0.05 | 100 | 10 |
| | 0.10 | 100 | 18 |
| | 0.20 | 100 | 45 |
| Untreated 9-oz. Duck | | 0 | 0 |

[1] Spray Test CCC-T-191b, Method 5526.
[2] Suter Test CCC-T-191b, Method 5516.
[3] Water repellent, 5% paraffin wax added.

EXAMPLE 2

I proceeded exactly as in Example 1 which discloses the specific stoichiometric ratio of one part of the aluminum triisopropylate to 2 parts of a-dodecenyl succinic panied with mechanical agitation and external heating to 140° F. To this mixture 20 parts of xylol and 20 parts of morpholine were added. After 15 minutes' agitation a homogeneous solution was obtained. This concentrate was readily soluble in most organic solvents.

EXAMPLE 6

33 parts of the copper salt of N-nitroso N-p-octyl phenylhydroxyl amine were added to 160 parts of aluminum tri nonylphenylate, 35 parts of mineral spirits, and 15 parts N-dodecyclpropylene diamine. After agitating at 185° F. for 45 minutes a homogeneous green solution is obtained. This material was soluble in mineral spirits, high flash naphtha, toluol, xylene and ethoxy ethanol.

Fiber board impregnated with 2% of this copper compound was highly resistant to fungicidal attack.

EXAMPLE 7

35 parts of copper N-nitroso N-phenylhydroxyl amine were added to 75 parts of titanium dioctylate di(monooctyl acid adipate), 65 parts toluene and 25 parts of 2-amino-2-methyl-1-propanol. The mixture was agitated at 120° F. for one-half hour to obtain a homogeneous solution. This concentrate was soluble in benzene, xylene and other common organic solvents.

The resultant product may be used as fungicidal and/or fungistatic compositions in both liquified state or as hot or cold solutions of the aforementioned solvents.

EXAMPLE 8

8 parts of the zinc salt of N-nitroso N-phenylhydroxyl amine and 12 parts of the cadmium salt of a-N-nitroso N-naphthylamine were dissolved in a mixture of 80 parts of zirconium monobutylate tri(butyl a-octadecenyl acid succinate), 32 parts of high flash naphtha, and 20 parts of N-hydroxyethyl morpholine upon heating at 180° F. for 35 minutes.

The resultant product was a free flowing mass which was readily soluble in the aforementioned solvents.

EXAMPLE 9

18 parts of the copper salt of N-nitroso N-phenylhydroxyl amine were dissolved in a mixture of 68 parts of aluminum didodecylate mono naphthenate, 32 parts of mineral spirits and 5 parts of cocoamine upon heating at 130° F. with agitation for 10 minutes. This concentrate can be diluted readily with common organic solvents.

EXAMPLE 10

12 parts of the mercury salt of N-nitroso-o-hydroxy-N-phenyl hydroxyl amine were dissolved in a mixture of 40 parts of zirconium monoxylenolate trilaurate, 30 parts of xylol and 3 parts diethanolamine by agitating at 160° F. for 40 minutes.

The dark red, free-flowing solution thus obtained was readily dilutable with perchloroethylene, kerosene and mineral oil.

EXAMPLE 11

20 parts of the zirconium salt of N-nitroso-n-phenyl-hydroxyl amine were dissolved with 70 parts of zirconium tetra 2-ethyl hexylate, 5 parts of morpholine and 25 parts of xylol by heating at 155° F. for 10 minutes. This solution is dilutable in toluene, benzene and hexane.

EXAMPLE 12

5 parts of aluminum N-nitroso N-phenylhydroxyl amine and 10 parts of magnesium N-nitroso m-methoxy n-phenylhydroxyl amine were solubilized with 48 parts of aluminum monoisopropylate di(isopropyl a-dodecenyl acid succinate), 3 parts of aniline and 37 parts of high flash naphtha by heating at 280° F. for 15 minutes.

The resulting amber solution is readily soluble in most common organic solvents.

EXAMPLE 13

14 parts of calcium N-nitroso N-phenylhydroxyl amine and 3 parts of barium N-nitroso N-o-tolylhydroxyl amine were solubilized by heating at 130° F. for 35 minutes with 48 parts of aluminum monophenylate di(isopropyl a-octodecyl acid succinate), 12 parts of butylamine and 38 parts of amyl acetate.

The resulting homogeneous solution was soluble in benzene, carbon tetrachloride and kerosene.

EXAMPLE 14

18 parts of sodium N-nitroso N-phenylhydroxyl amine were dissolved in 35 parts of aluminum di-butylate monooleate, 13 parts of morpholine and 52 parts of xylene by agitating at 120° F. for 15 minutes.

The resulting homogeneous solution gave clear dilutions with mineral spirits, kerosene and fuel oil.

The following examples are appropriate to my procedure in the absence of an amine:

EXAMPLE 15

I proceeded as in Example 1, but omitted the amine and employed 145 parts of the aluminum mono isopropylate di(isopropyl a-dodecenyl acid succinate).

The end product possessed similar solubility characteristics.

It will be noted that in this example I employed approximately one-third more of the aluminum solubilizing agent which, because of the higher cost of this product, resulted in an end product which is appreciably more expensive to produce than the end product of Example 1.

EXAMPLE 16

20 parts of the zinc salt of N-nitroso N-3-chlorophenylhydroxyl amine were added to 165 parts of zirconium tributylate monooleate and 80 parts of xylol with vigorous agitation at 175° F. After 30 minutes a deep red solution was obtained. This solution was soluble in benzene, carbon tetrachloride, and toluene.

EXAMPLE 17

To 160 parts of aluminum monobutylate di(butyl a-decenyl acid succinate) were added 25 parts of tin N-nitroso N-phenylhydroxyl amine and 30 parts of diisobutyl ketone. The mixture was heated to 180° F. with agitation for 30 minutes in order to obtain a homogeneous solution, which is soluble in mineral oil, gasoline and kerosene.

EXAMPLE 18

10 parts of the iron salt of N-nitroso-m-dimethyl amino N-phenylhydroxyl amine were solubilized in a mixture of 18 parts of aluminum trioctylate, 18 parts of zirconium monononylphenylate tri-naphthenate and 54 parts of mineral spirits by agitation for 30 minutes at 250° F. This solution is soluble in hexane and diisobutyl ketone.

EXAMPLE 19

28 parts of the copper salt of N-nitroso-p-phenyl N-phenylhydroxyl amine were solubilized by 72 parts of titanium tetra isopropylate by heating at 180° F. for 15 minutes.

The resulting product was a heavy homogeneous liquid soluble in toluol, xylol and terpentine.

EXAMPLE 20

11 parts of cobalt N-nitroso N-phenylhydroxyl amine were dissolved in 30 parts of tetra octyl titanate and 40 parts of mineral spirits by agitating for 30 minutes at room temperature.

The resulting homogeneous solution is soluble in cyclohexane and toluol.

EXAMPLE 21

15 parts of potassium N-nitroso N-phenylhydroxyl amine were dissolved in 40 parts of tetra octyl zirconate and 45 parts of benzene by agitating for 45 minutes at 130° F.

The resulting solution was soluble in mineral spirits, isopropyl acetate and butyl benzoate.

When the metal salts of N-nitroso N-arylhydroxyl amines are solubilized in the manner hereinbefore described, end products are obtained which I believe to be compositions in the form of mixtures although it is possible that they may constitute at least in part one or more true chemical compounds which are the reaction products of the components involved. Consequently the invention is to be understood as including both of these aspects to which I have referred.

In the foregoing detailed description I have set forth the preferred manner of producing the present invention and the chemical constituents entering into the reactions. The invention is to be understood as fully commensurate with the appended claims.

Having thus fully described the invention, what I claim as new and desire to secure by Letters Patent is:

1. An oil-soluble composition comprising: a normally oil-insoluble metal salt of an N-nitroso N-aryl-hydroxylamine of a metal selected from the group consisting of copper and zinc, in homogeneous solution in a vehicle consisting essentially of a metal alcoholate of the following general structure $Me(OR)_n$, wherein Me is a metal selected from the group consisting of aluminum, titanium and zirconium, $n$ is the valence of the metal, and wherein at least one R is the alkyl half ester of a-dodecenyl succinic acid, the alkyl radical of said ester being derived from alcohols of the group consisting of isopropyl, butyl, isooctyl, decyl, octadecyl, methoxyethyl, octadecenyl, dodecyl, dodecenyl, and the remaining R's are alkyl radicals derived from the aforesaid alcohols, and a solvent selected from the group consisting of benzene, toluene, kerosene, fuel oil, mineral spirits, solvent naphtha, Stoddard solvent, pine oil, turpentine, hexane, carbon tetrachloride, gasoline, isopropyl acetate.

2. An oil-soluble composition according to claim 1, wherein the vehicle includes an organic amine selected from the group consisting of di n-butyl amine, 2-ethylhexyl amine, cocoamine, triethanolamine, propylene diamine, N-dodecyl propylene diamine, isopropylamine, aniline, dimethylaniline, morpholine, N-aminopropyl morpholine, 2-methyl, 2 amino, 1-propanol, diisopropanolamine, o-phenylene diamine, N-hydroxyethyl morpholine, aminoethyl ethanolamine, tributylamine, didodecyl methylamine, octa-decenylamine, dioctadecylamine.

References Cited in the file of this patent

UNITED STATES PATENTS

| | | |
|---|---|---|
| 2,373,777 | Peterson | Apr. 17, 1945 |
| 2,411,819 | Amott | Nov. 26, 1946 |
| 2,649,397 | Ballard | Aug. 18, 1953 |
| 2,635,978 | Massengale | Apr. 21, 1953 |

OTHER REFERENCES

J.A.C.S., vol. 78, page 4206.
Chem. Abs. 19, 1232 (1925).